United States Patent
Burkart

(10) Patent No.: US 6,470,762 B1
(45) Date of Patent: Oct. 29, 2002

(54) SLIDING GEAR DRIVE

(75) Inventor: Harald Burkart, Villingen-Schwenningen (DE)

(73) Assignee: Mannesmann VDO AG, Frankfurt (DE)

(*) Notice: Subject to any disclaimer, the term of this patent is extended or adjusted under 35 U.S.C. 154(b) by 0 days.

(21) Appl. No.: 09/661,962

(22) Filed: Sep. 14, 2000

(30) Foreign Application Priority Data

Sep. 16, 1999 (DE) .................... 299 16 314 U

(51) Int. Cl.⁷ .................. G05G 7/04; G05G 9/08; G06K 13/04
(52) U.S. Cl. ............... 74/110; 74/516; 74/569; 235/479
(58) Field of Search .............. 74/110, 480 R, 74/516, 569; 235/479

(56) References Cited

U.S. PATENT DOCUMENTS

| | | | | |
|---|---|---|---|---|
| 2,140,658 A | * | 12/1938 | Van Sittert | 74/110 |
| 2,589,096 A | * | 3/1952 | Landergren | 74/44 |
| 2,766,497 A | * | 10/1956 | Noyes | 164/345 |
| 4,182,435 A | * | 1/1980 | Dadian | 188/72.7 |
| 4,337,690 A | * | 7/1982 | Severinsson | 92/129 |
| 5,879,175 A | * | 3/1999 | Muramatsu et al. | 235/479 X |

* cited by examiner

Primary Examiner—Allan D. Herrmann
(74) Attorney, Agent, or Firm—Sidley Austin Brown & Wood, LLP

(57) ABSTRACT

In a flat sliding gear drive formed of flat panel-shaped sliding elements (1), (2), with a first sliding element (1) connected to a motor and a second sliding element (2) connected to a variable load, the first and second sliding elements (1), (2) have interacting wedge surfaces which are curved for providing a uniform torque loading of the driving motor.

8 Claims, 3 Drawing Sheets

SLIDING GEAR DRIVE

BACKGROUND OF THE INVENTION

The present Invention is directed to a sliding gear drive with a first sliding element in connection with a motor and a second sliding element, engaged by a variable load, and in engagement with the first sliding element by a wedge-shaped transmission connection.

Sliding gear drives are generally used where, for spatial or other functional reasons, a direct and linear force flow deflection is desired. In addition, sliding gear drives offer the capability of a path reduction/power ratio, and in particular the advantage of being able to interrupt the gear connection after a shifting motion and locking of the driven sliding element, for example, in conjunction with a step function, the driving sliding element can be returned to its starting position.

As an example, a data card unit represents a typical application case. In a data card unit, a data card carrier, in a read/write position of the data card, must be shifted against the action of a spring into a removal position when the data card is to be removed. In this position, a locking of the data card carrier takes place. When inserting a data card in such an arrangement, the data card carrier is unlocked and displaced my means of a spring into the read/write position. Accordingly, in the read/write position, it lies against a stop under the action of the spring.

If, for example, the data card unit is used in a commercial vehicle, then it is necessary, to insure exact positioning or contacting of an inserted data card and to exclude the risk of positional changes due to operationally induced vibrations, that the data card carrier must be under a relatively large contacting pressure in the read/write position. As a result, the motor, moving the data carrier by means of the sliding gear drive, is acted upon by a relatively large initial load and by an additional transporting load, which increases with the shifting of the data card carrier. Further, the data card is to be removed in a relatively short time whereby an appropriately powerful motor must be used. The high costs resulting from such an arrangement are not acceptable, especially if it is located in the instrument area of a vehicle. This means that motors, suitable with respect to torque, cannot be used. In addition, as a result of various voltage drops, the full voltage of the vehicle battery is not available and the current consumption is limited for safety reasons as well as legal provisions.

Of course, the torque required by the motor can be reduced owing to the fact that a high transmission reduction is provided between the motor and the driving sliding element and/or that the wedge angle of the sliding gear drive is constructed relatively flat. In each of these cases, the waiting time for removing data cards is unacceptable. Moreover, additional space is required and, due to the transmission expansion, the costs are increased.

SUMMARY OF THE INVENTION

Therefore, a primary object of the present invention is to gain a sufficiently short actuation of the driven sliding element in geared connection and formed by a sliding gear drive and acted upon with a variable load even when the driving power is limited and to achieve the object at a cost which can be justified for continuous production.

In accordance with the present invention, a wedge gear connection is provided so that the motor is acted upon by a torque not proportional to the variable load.

In a preferred embodiment of the wedge gear connection, the wedge surfaces of the sliding elements, interacting during transmission, have a curved configuration in the sliding direction.

Further advantageous developments of the invention are evident from the dependent claims.

The advantage afforded by the invention is that a variable wedge angle between the sliding elements is particularly effected in that it can be accomplished without any additional technical effort, that is, without additional components and that only the basic or initial load has to be taken into consideration for the torque required to drive the motor. A suitable curved shape for the interacting wedge surfaces, a torque compensation and optionally, a constant torque requirement for the driving motor can be created even in the case of loads which do not increase linearly. Furthermore, the inventive arrangement can also be used for a case in which a constant load to be moved at different speeds and torque, required by the driving motor, is to be kept essentially constant.

The various features of novelty which characterize the invention are pointed out with particularity in the claims annexed to and forming a part of this disclosure. For a better understanding of the invention, its operating advantages and specific objects attained by it use, references should be had to the drawings and description matter in which there are illustrated and described preferred embodiments of the invention.

DETAILED DESCRIPTION OF THE INVENTION

Figure 1:
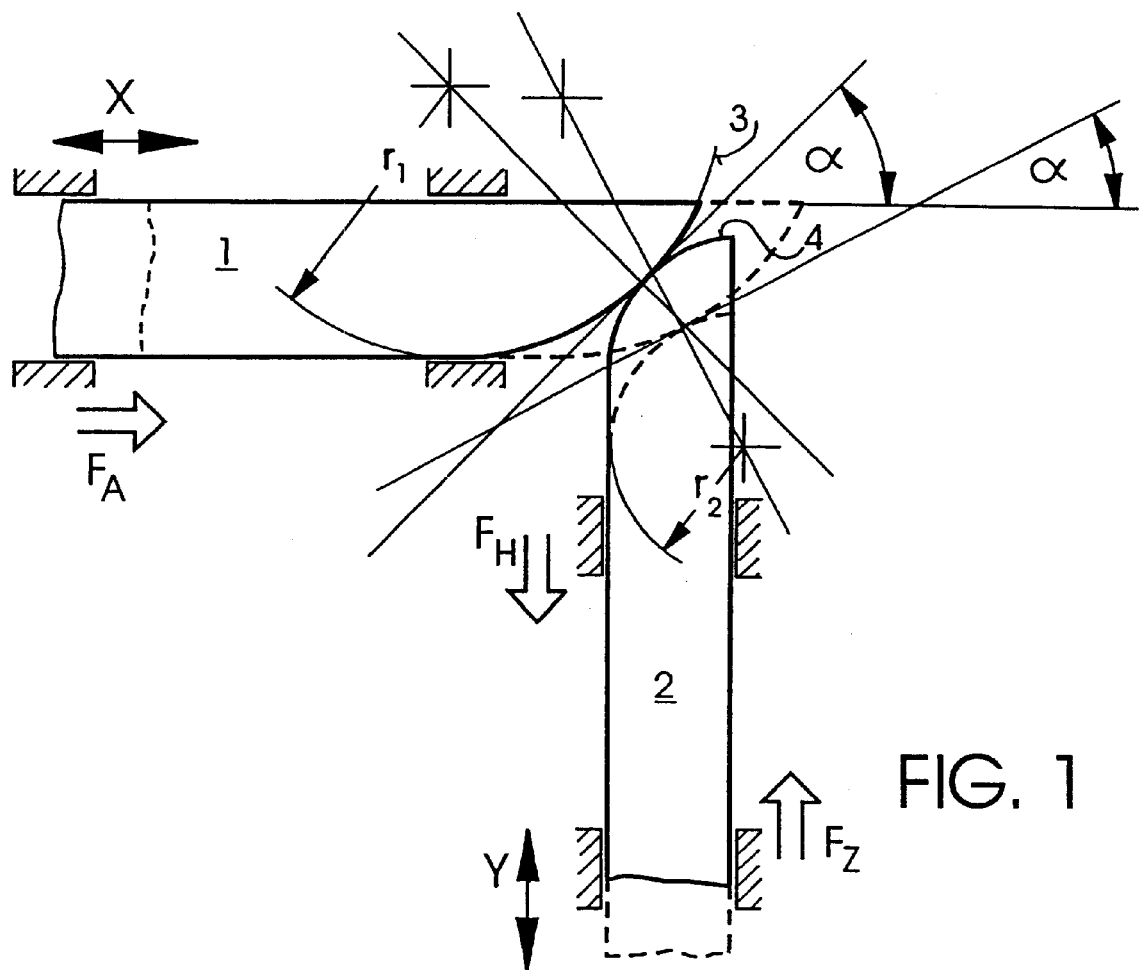
FIG. 1 is a schematic showing of the manner in which the inventive sliding gear drive functions.
Figure 4:
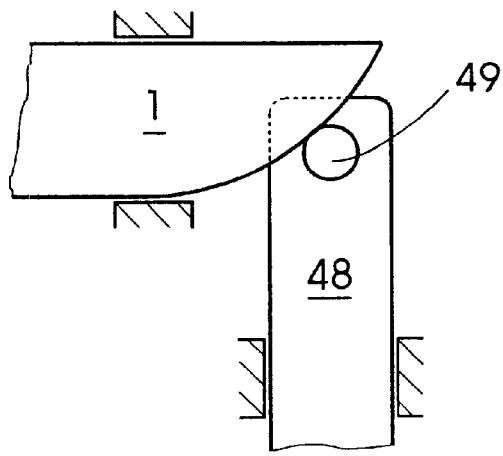
FIG. 4 is a schematic showing another embodiment of the inventive sliding gear drive.

As shown schematically in FIG. 1, a first sliding element 1, mounted for displacement in the directions of arrow X, is in wedge gear engagement with a second sliding element 2 displaceable in the directions of the arrow Y. A driving force $F_A$ acts on the sliding element 1. A lifting force $F_H$, resulting from the wedge gear engagement between the first sliding element 1 and the second sliding element 2, acts counter to a path-dependent varying force Fz of a tension spring engaging the sliding element 2. An adjustment so that $F_A$ and with it the torque required by the motor remain essentially constant, is accomplished by constructing the wedge surfaces 3, 4 of the sliding elements 1, 2 disposed in a gear connection, as curved surfaces. The first and second sliding elements 1, 2 are flat, panel shaped components in the simplest case, the curved surfaces can be formed as arcs of a circle. The lengths of the designated radii are $R_1$ and $R_2$ and the positions of the respected middle points, which are not shown, can be freely selected within certain limits, but also optimized mathematically for the intended object of a variable torque relief of the driving motor. As shown in FIG. 1, it is essential that the wedge angle be variable and decreases from 45° in the starting position to 20° in the final or latched position of the driven component. In the embodiment described as follows, the driven component represents a carriage in the form of a data carrier.

In another embodiment, the first sliding element 1 can be in engagement with the second sliding element 48 by a pin 49.

Figure 2:
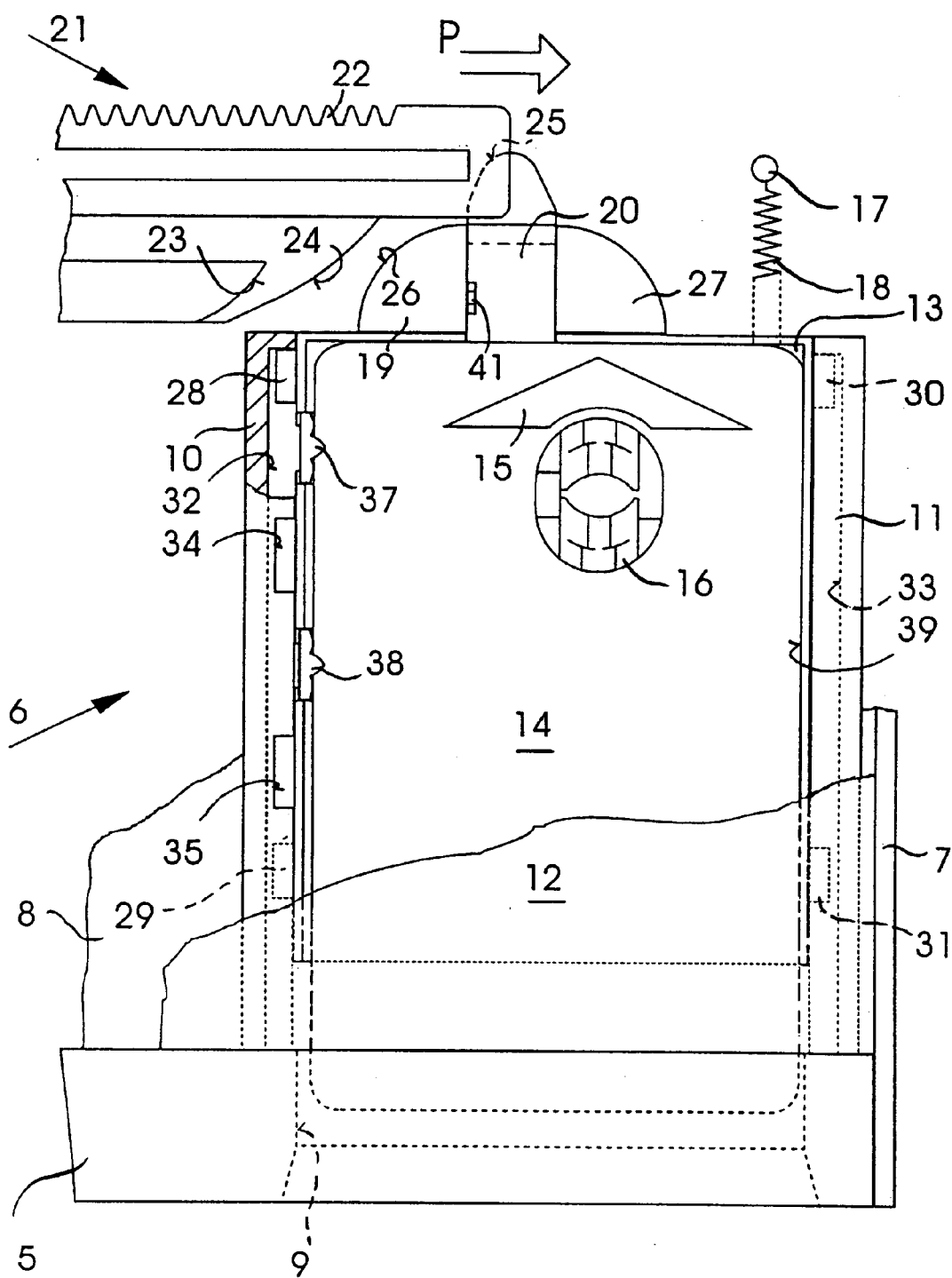
FIG. 2 is a plan view of a data card unit with transporting means embodying the present invention with the data card unit in the read/write mode.

As shown in FIG. 2, a front wall 5 of a housing, for example a tachograph, is shown in which a data card unit 16 is arranged. A side wall 7 and a bottom 8 form a part of the housing. In the front wall 5, usually containing at least different keys (one serves for producing a data card output signal) and a LC display are provided though not shown, because they are not essential to the invention. In the front wall 5 a slot 9 is arranged serving as front access to the data card unit 6. The data card unit is formed of two side guide walls 10, 11 fastened in a suitable manner or integrally molded directly to a printed circuit 4 of the unit, along with a carriage 13, displaceably supported in the side guide wall 10, 11, and constructed as a data card carrier. Further, FIG. 2 illustrates a data card 14 provided with an arrow 15 indicating the correct input position and input direction, as well as a contact area 16. A contact bank, assigned to the data card 15, is fastened on the printed circuit board 12, however, it cannot be seen in the cut-out of the printed circuit board 12 in FIG. 2. One end of a tension spring 18, effecting the transport of the carriage 13 into the read/write position shown in FIG. 2 is fixed at a stationary pin 17 or at another suitable element. In the illustrated position, a tab 19 integrally molded to the carriage 13 and a slide 20, displaceably supported on the carriage 13 extend into the path of movement of the sliding element 21 guided transversely of the carriage 13. The sliding element 21 supported in a suitable manner, has a gear tooth system 22 which is connected to a driving motor by a transmission chain, not shown. Two wedge surfaces 23, 24 on the sliding element 21 have a curved configuration. When the sliding element 21 is moved in the direction of the carriage 13, wedge surfaces 25, 26 integrally molded on the tab 19 and the slide 20, respectively, interact with the wedge surface 23,24. Another tab 27 constructed symmetrically to the tab 19 on the carriage 13, enables the data card unit 6 to be installed in such a manner that the carriage 13 can be triggered from the opposite direction shown in FIG. 2.

Figure 3:
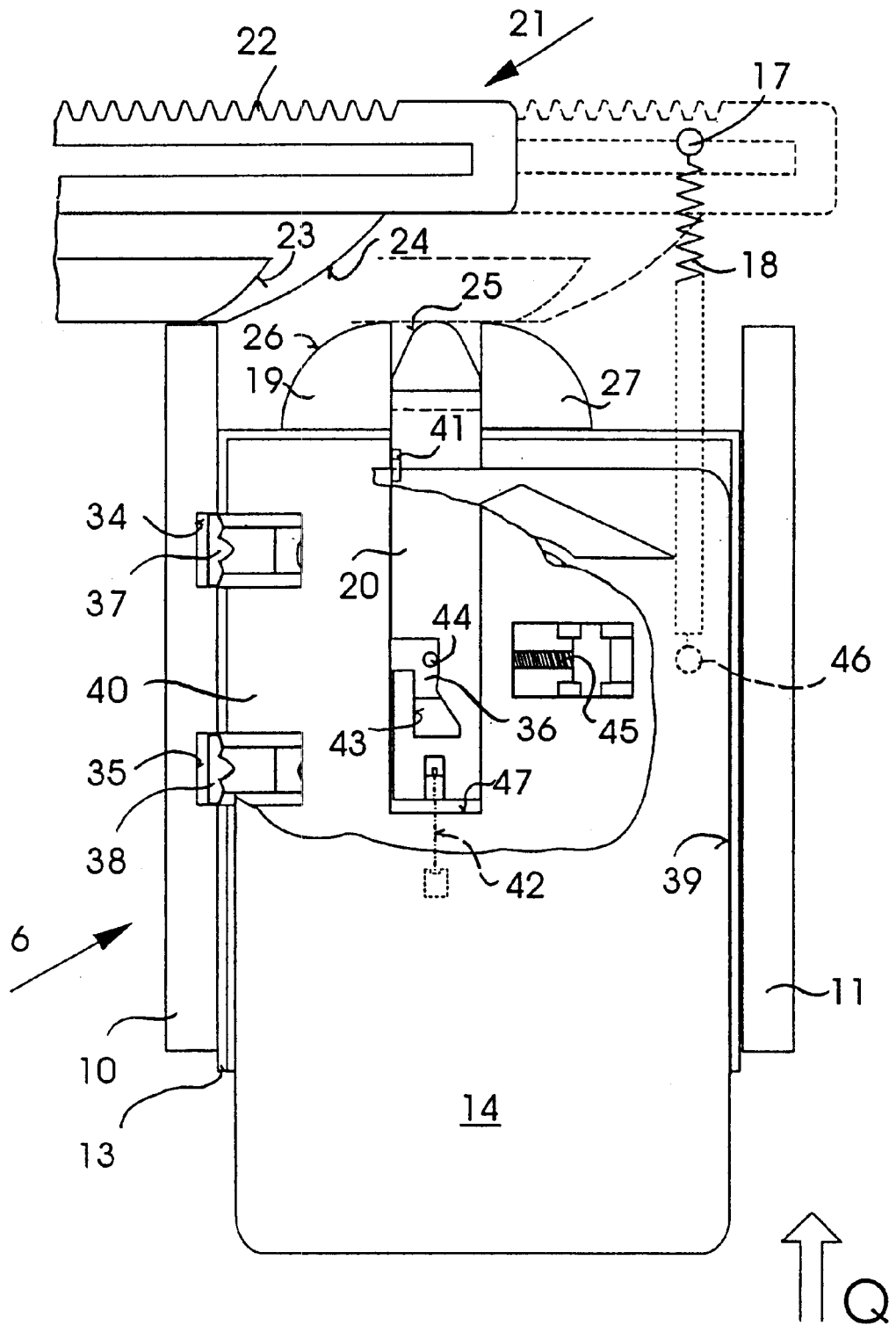
FIG. 3 is also a plan view of the data card unit and provided with cut-outs illustrating the data card unit in an input mode.

If the tilting point of the tilting over-center device is exceeded when placing a data card 14 in the direction of the arrow Q, the carriage 13 is unlocked under the action of the compression spring, at the same time the data card 14 is held at the side and, under the action of the compression spring, at the same time the data card 14 is held at the side and, under the action of the tension spring 18, one end of which is supported by a small post 46 attached to the carriage, transport of the carriage 13 into the read/write position takes place. In the reverse case, when the data cards 14 are removed, an operation must be triggered, for example, by actuating a key, and the sliding element 21 is shifted by the motor in the direction of the arrow T and, at the same time, the carriage with the wedge surfaces 24, 26 entered into a sliding connection, is shifted into a position where the fingers 37, 38 are opposite the recesses 34. 35. Upon further transport of the sliding element 21, the wedge surfaces 23, 25 become drivingly connected with each other and, as a result the slide 20, with the carriage 13 stationary, is shifted up to the tilting point of the tilting over-centered device. Subsequently, a component of the compression spring 45 and of the tension spring 42 conduct the slide 20 to a stop 47 with the connecting link being arranged so that the fingers 37, 38 and the recesses 34, 35 remain engaged. Advisable, the sliding element 21, as shown in FIG. 3, is moved with an over-lift to actuate a switch reversing the direction of movement of the driving motor. Accordingly, it is returned to the starting position, permitting the input of a data card 14 and a shifting of the carriage into the read/write position.

In the operational position illustrated in FIG. 2, with the data card 14 in the read/write position, the fingers 37, 38 grasp the side of the data card 14 and hold the card at the opposite wall of a holder 39 formed in the carriage 13 and assigned to the data cards 14. In this arrangement, the slides 20,36 are formed at the carriage 13 with H-shaped prismatic guides and end flush with the surface 40 (FIG. 3) of the holder 39 in the carriage 13. Only a nose 41, formed on the slide 20, engages the holder which has at its edge holding-down devices arranged parallel to the surface 40, but not shown, when the carriage 13 is in the insertion/removing position with the fingers 37, 38 of the T-shaped slide 36 disposed in working connection with the recesses 34, 35. Accordingly, when data cards 14 are placed in the data card unit 6, the slide 20 is shifted by the nose 41 opposite to the action of a tension spring 42 and, at the same time, a tilting over-center device is triggered provided between the slide 20 and the slide 36 and provides two stable positions of the slides 20, 36. The tilting over-center device consists of a connecting link 43 formed in the slide 20 and provided with a tilting point, a pin 44 fastened at the slide 36 and in working connection with the connecting link 43 along with a compression spring 45 which on one hand engages the slide 36 and on the other supports the carriage 13. In this connection, it is noted that the force of the compression spring 45 is considerably greater than that of the tension spring 42.

If the tilting point of the tilting over-center device is exceeded when placing a data card 14 in the direction of the arrow Q, the carriage 13 is unlocked under the action of the compression spring, at the same time the data card 14 is held at the side and, under the action of the compression spring, at the same time the data card 14 is held at the side and, under the action of the tension spring 18, one end of which is supported by a small post 46 attached to the carriage, transport of the carriage 13 into the read/write position takes place. In the reverse case, when the data cards 14 are removed, an operation must be triggered, for example, by actuating a key, and the sliding element 21 is shifted by the motor in the direction of the arrow T and, at the same time, the carriage with the wedge surfaces 24, 26 entered into a sliding connection, is shifted into a position where the fingers 37, 38 are opposite the recesses 34, 35. Upon further transport of the sliding element 21, the wedge surfaces 23, 25 enter into a gear connection and as a result the slide 20, with the carriage 13 stationary, is shifted up to the tilting point of the tilting over-centered device. Subsequently, a component of the compression spring 45 and of the tension spring 42 conduct the slide 20 to a stop 47 with the connecting link being arranged so that the fingers 37, 38 and the recesses 34, 35 remain engaged. Advisably, the sliding element 21, as shown in FIG. 3, is moved with an over-lift to actuate a switch reversing the direction of movement of the driving motor. Accordingly, it is returned to the starting position, permitting the input of a data card 14 and a shifting of the carriage into the read/write position.

What is claimed as new and desired to be protected by letters patent is set forth in the appended claims.

What is claimed is:

1. A sliding gear drive, comprising a first sliding element (1) arranged to be connected to a drive motor; a second sliding element (2) arranged to be engaged by a variable load and in engagement with said first sliding element by a wedge transmission connection, and said wedge transmission connection being arranged so that the drive motor is acted upon by a torque not proportional to the variable load;

wherein said first and second sliding elements (12) are formed as flat panel-shaped components, and each of said components has an end surface forming the wedge transmission connection with the end surfaces having a curved form, and wherein the first driving sliding element (21) is stepped in a sliding direction, and the stepped end surface is shaped as an additional wedge surface (23), and wherein at least two separately mounted driven second sliding elements (13), (20) are provided.

2. A sliding gear drive, as set forth in claim 1, wherein one of the driven second sliding elements (13), (20) is formed as a carriage (13) for accommodating data cards (14), the other of said driven sliding elements is formed as a flat slide (20) and is displaceably mounted on said carriage (13).

3. A sliding gear drive, comprising a first, driving sliding element (1) including means (22) for connecting the first, driving sliding element (1) with a drive motor; a second, driven sliding element (2); means (18) for applying a variable load to the second, driven sliding element (2); and a wedge transmission connection (3,4) for drivingly connecting the first and second sliding elements and for applying to the drive motor a torque not proportional to the variable load applied to the second driven sliding element (2).

4. A sliding gear as set forth in claim 1, wherein the wedge transmission connection comprises interacting wedge surfaces (3, 4) provided on the first and second sliding elements (1, 2), respectively, and curved in a sliding direction.

5. A sliding gear drive as set forth in claim 1, wherein the wedge transmission connection has a variable wedge angle decreasing from about 45°, in a starting position of the first and second sliding elements, to about 20° in a latched position of the first and second sliding elements.

6. A sliding gear drive, as set forth in claim 3, wherein said first and second sliding elements (12) are formed as flat panel-shaped components, and each of said components has an end surface forming the wedge transmission connection with the end surfaces having a curved form.

7. A sliding gear drive, as set forth in claim 3, wherein each of said first and second elements (12) has a wedge surface (3), (4), forming the wedge transmission connection with the wedge surfaces forming an arc of a circle.

8. A sliding gear drive, as set forth in claim 3, wherein a pin (49) is provided on the second sliding element (48) for engaging a wedge surface (3) of said first sliding element (1) which forms part of the wedge transmission connection.

* * * * *